W. F. KOCH.
HAY COCKING MACHINE.
APPLICATION FILED JAN. 3, 1919.
1,310,573.
Patented July 22, 1919.
2 SHEETS—SHEET 1.
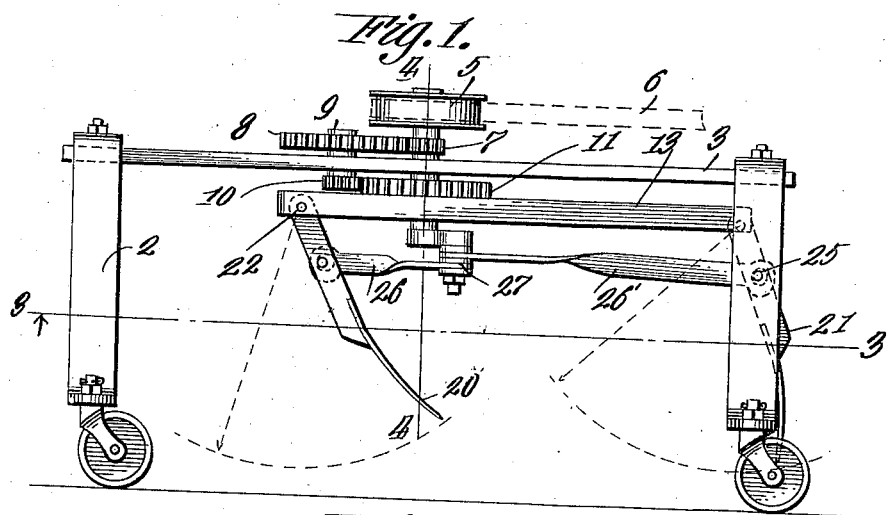
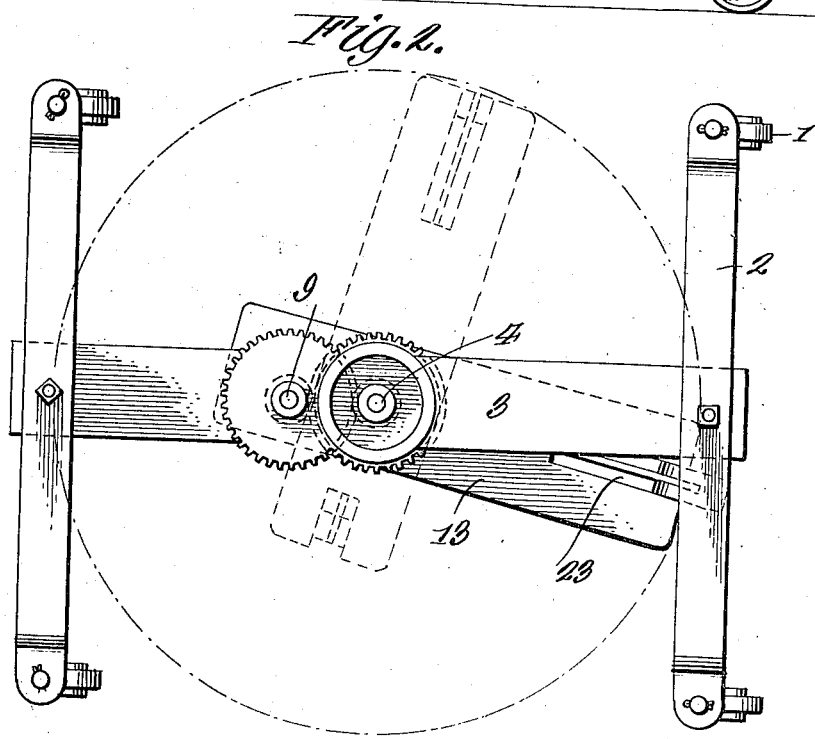
Witnesses
Guy M. Spring
N. L. Collamer
Inventor
William F. Koch
By Richard B. Owen,
Attorney W. F. KOCH.
HAY COCKING MACHINE.
APPLICATION FILED JAN. 3, 1919.
1,310,573.
Patented July 22, 1919.
2 SHEETS—SHEET 2.
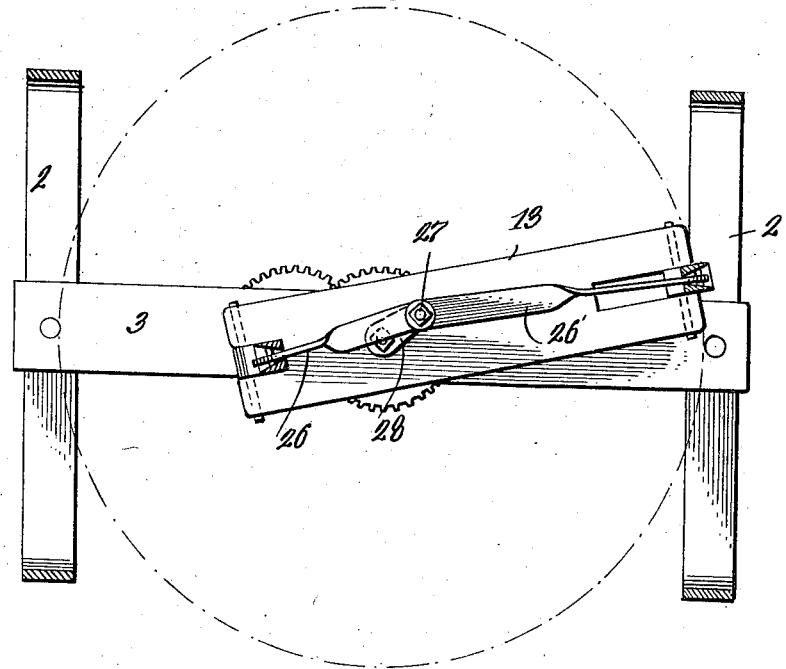
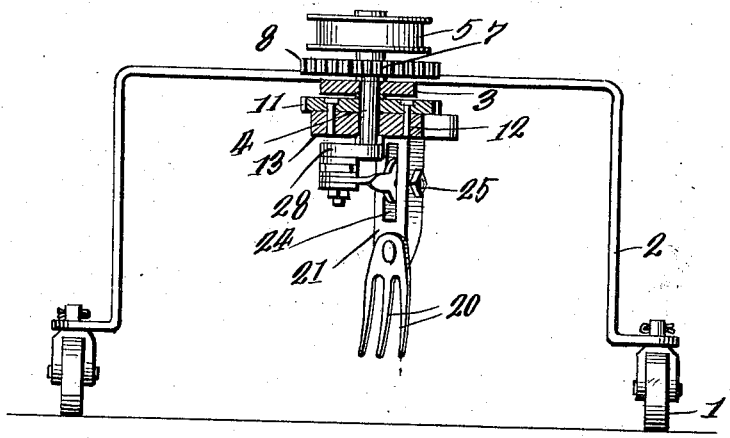
Witnesses
Guy M. Spring
Inventor
William F. Koch
By Richard B. Owen,
Attorney

UNITED STATES PATENT OFFICE.

WILLIAM F. KOCH, OF HILLSIDE, COLORADO.

HAY-COCKING MACHINE.

1,310,573.     Specification of Letters Patent.     Patented July 22, 1919.

Application filed January 3, 1919. Serial No. 269,438.

*To all whom it may concern:*

Be it known that I, WILLIAM F. KOCH, a citizen of the United States, residing at Hillside, in the county of Custer and State of Colorado, have invented certain new and useful Improvements in Hay-Cocking Machines, of which the following is a specification.

This invention relates to rakes, and more especially to cockers; and the object of the same is to produce a portable machine for collecting hay into a bundle or cock.

Another object is to produce a machine of this kind which may be driven from any suitable adjacent source of power by means of a belt.

A specific object of the invention is to make use of a new mechanical movement simultaneously driving the rakes or forks and rotating them around a vertical axis.

Details are set forth below and attention is drawn to the drawings wherein—

Figure 1 is a side elevation and

Fig. 2 a plan view of this machine.

Figs. 3 and 4 are sectional views on the lines 3—3 and 4—4 respectively of Fig. 1.

The framework or support for this machine may be any which will answer. In the present instance I have shown it of skeleton formation, and extremely light so that it may be moved to the proper point on the field, although it is possible that it may be drawn along the field if desired. As herein shown, caster wheels 1 support the feet of two similar arches 2 whose tops are connected by a horizontal beam 3, and the structure hereinafter described is supported at the center of this beam. It is quite obvious that instead of casters I might employ larger wheels, or the casters might in fact be omitted and the feet of of the arches rest on the ground. Journaled through the center of the beam 3 is a main shaft 4 standing upright and having in the present case a pulley 5 on its upper end which is adapted to be connected by belting 6 with a source of power whereby the shaft may be rotated in either direction when desired and at an appropriate rate of speed. Fast on the shaft beneath the pulley is a pinion 7 which is in constant mesh with a gear 8 fast on the upper end of a counter shaft 9 passing also vertically downward through the beam 3 and carrying at its lower end a pinion 10. The latter in turn meshes with a gear 11 which is secured in any appropriate manner, as by the bolts 12 shown in Fig. 4, upon an element which may be appropriately called the rake head 13, and through which the main shaft passes loosely. The result of this construction is that the lower end of the main shaft revolves at the same speed as the pulley 5, but the rake head 13 is swung upon said shaft at a slower speed through the instrumentality of the reducing gearing described.

The rakes may be of any appropriate construction, but as herein shown I make each in the form of a series of tines 20 at the lower end of a standard 21 whose upper end is pivoted at 22 within a fork 23 at one end of the rake head 13. Each standard is recessed or slotted as indicated at 24 in Fig. 4 and within such recess at 25 is pivoted the outer end of a link 26, there being in the present case one short link 26 and another somewhat longer numbered 26' because the rake head is mounted off its center on the main shaft 4 so that it has one short arm and one long arm. In other words, the rakes themselves are disposed at different distances from the center of rotation of the rake head. Each link as herein illustrated is composed of strap metal given a twist within its length, and their inner ends are mounted as at 27 on the crank pin of a crank arm 28 which is rigidly secured to the lower end of the main shaft. The pivots at 25 and 27 will be sufficiently loose to permit the links to connect this crank with the two swinging standards in such manner that the parts may have the operation to be described below.

When now rotary motion is imparted to the driving pulley 5, the small pinion 7 on the main shaft through the reducing gearing causes the gear 11 to rotate slowly and therefore the rake head swings around said main shaft more slowly than the shaft itself revolves. In so swinging, the two rakes are carried with the extremities of said head and therefore move through different circles. Meanwhile the crank 28 rotates as rapidly as the driving pulley, and its motion is communicated through the links to the rakes, which latter are swung on their pivots 22 as indicated in dotted lines in Fig. 1. The hay or grain upon the ground, or that which may be fed to this machine, is therefore rapidly passed from all sides toward a central point or "cocked" in a manner well understood.

The foregoing description and drawings have reference to the preferred form of my invention. It is to be understood however, that I may make certain changes in construction and arrangement and combination of parts, materials, dimensions, et cetera, as may prove expedient and fall within the scope of the appended claims.

Having thus fully described my invention, what I claim as new and useful and desire to secure by Letters Patent is:—

1. In a hay cocker, the combination with a horizontal beam mounted on supports, an upright main shaft journaled through said beam and cranked at its lower end, and means for applying rotary motion to its upper end; of a beam loosely mounted on said shaft below the supporting beam, rakes pivotally supported by the extremities of the last-named beam, links connecting the rakes with said crank, and means for swinging this beam on its support.

2. In a hay cocker, the combination with a horizontal supporting beam, an upright main shaft mounted through its center and having a crank at its lower end, and a driving pulley on the upper end of the shaft; of a rake head consisting of a second beam loosely mounted on the shaft above its crank, rakes comprising standards hinged at their upper ends to the extremities of said rake heads and having tines at their lower ends, links loosely connecting said standards with the crank, and means for swinging the rake head around the shaft more slowly than said shaft revolves.

3. In a hay cocker, the combination with a horizontal supporting beam, an upright main shaft mounted through its center and having a crank at its lower end, and a driving pulley on the upper end of the shaft; of a rake head consisting of a second beam loosely mounted on the shaft above its crank, rakes comprising standards hinged at their upper ends to the extremities of said rake head and having tines at their lower ends, links loosely connecting said standards with the crank, a pinion fast on the main shaft, a gear fast on the rake head, and reducing gearing connecting said pinion and gear.

4. In a hay cocker, the combination with a horizontal supporting beam, an upright main shaft mounted through its center and having a crank at its lower end, and a driving pulley on the upper end of the shaft; of a rake head consisting of a second beam loosely mounted on the shaft above its crank, rakes comprising standards hinged at their upper ends to the extremities of said rake head and having tines at their lower ends, links loosely connecting said standards with the crank, a pinion fast on the main shaft above said beam, a gear fast on the rake head below said beam, a counter-shaft journaled through said beam on one side of the main shaft, and a gear on the upper end thereof connecting with said pinion and a pinion on the lower end connecting with said gear, for the purpose set forth.

5. In a device of the class described, the combination with a horizontal supporting beam, and an upright rotating shaft journaled therethrough and having a crank on its lower end; of a rake head loosely mounted on said shaft above its crank, rakes movably mounted at the extremities of said head, connections between them and said crank, and reducing gearing connecting said shaft with the rake head, whereby the latter is rotated around the shaft more slowly than the shaft revolves.

6. In a device of the class described, the combination with a horizontal supporting beam, and an upright rotating shaft journaled therethrough and having a crank on its lower end; of a rake head loosely mounted on said shaft above its crank, rakes movably mounted at the extremities of said head, connections between them and said crank, a pinion fast on the shaft above said beam, a gear fast on the rake head below said beam, and a counter shaft having a gear and pinion respectively meshing with said pinion and gear, for the purpose set forth.

7. In a machine of the class described, the combination with a horizontal support and an upright main shaft rotatably mounted therethrough and having a crank at its lower end and means for driving it on its upper end, and a horizontal rake head loosely mounted on said shaft above its crank and forked at its extremities, of two rakes each comprising a standard pivoted in one of said forks and recessed in its body and tines at its lower end, two links each pivoted at its outer end in one of said recesses and twisted in its body and pivoted at its inner end on said crank, and connections between said shaft and rake head for swinging the latter around the shaft as the crank revolves.

In testimony whereof I affix my signature in presence of two witnesses.

WILLIAM F. KOCH.

Witnesses:
HARRY HOWARD,
JOHN T. MCNEELY.

Copies of this patent may be obtained for five cents each, by addressing the "Commissioner of Patents, Washington, D. C."